United States Patent [19]

Twining

[11] 4,263,717
[45] Apr. 28, 1981

[54] LOCATING TOOL
[76] Inventor: Robert A. Twining, 104 Glen Oak Dr., Springfield, Mass. 01129
[21] Appl. No.: 28,864
[22] Filed: Apr. 10, 1979
[51] Int. Cl.³ ............................................. G01B 3/30
[52] U.S. Cl. .................................... 33/180 R; 33/189
[58] Field of Search ............... 33/180 R, 41 R, 41 E, 33/41 F, 42, 174 R, 189

[56] References Cited
U.S. PATENT DOCUMENTS
2,581,179  1/1952  Eldh ...................................... 33/41 E
2,600,098  6/1952  Del Debbio ......................... 33/41 F

*Primary Examiner*—Harry N. Haroian
*Attorney, Agent, or Firm*—Ross, Ross & Flavin

[57] ABSTRACT

A locating tool for facilitating the installation of relatively stiff floor covering material such as congoleum, linoleum, vinyl and similar sheet material comprising, a flat tool having opposed ends with edges for locating inside and outside corners and pipes or circular objects and opposed side edges for locating straight wall surfaces, locating tabs extending upwardly from the tool adjacent each side and end of sufficient length to produce an indentation in a piece of floor covering material pressed thereon, but not of sufficient length to completely penetrate the floor covering material, the locating tabs being inserted in such indentations when the floor covering material is rolled back and the tool laid on the bottom side of the floor covering material so that the end or side edges of the tool can be traced to provide an exact duplicate of the corner or wall being located, or one end of the tool can be utilized to provide an indication of the diameter of pipes or circular objects being located.

6 Claims, 8 Drawing Figures

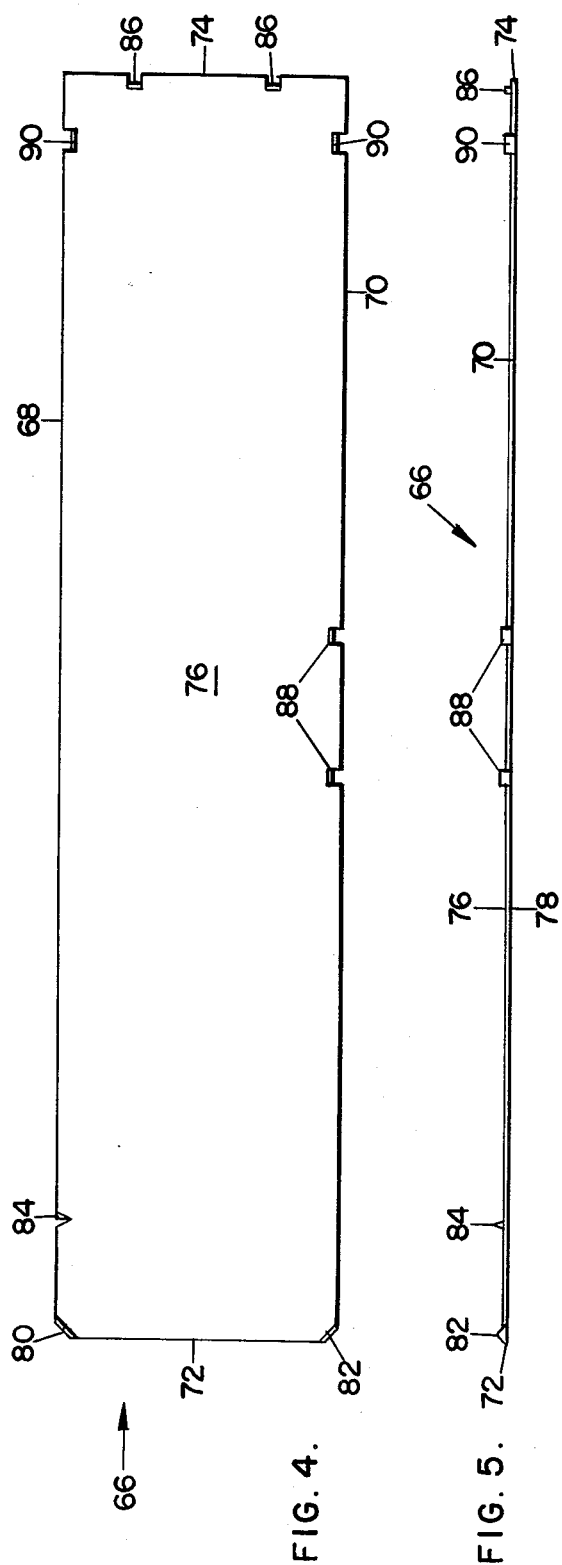
FIG. 4.
FIG. 5.
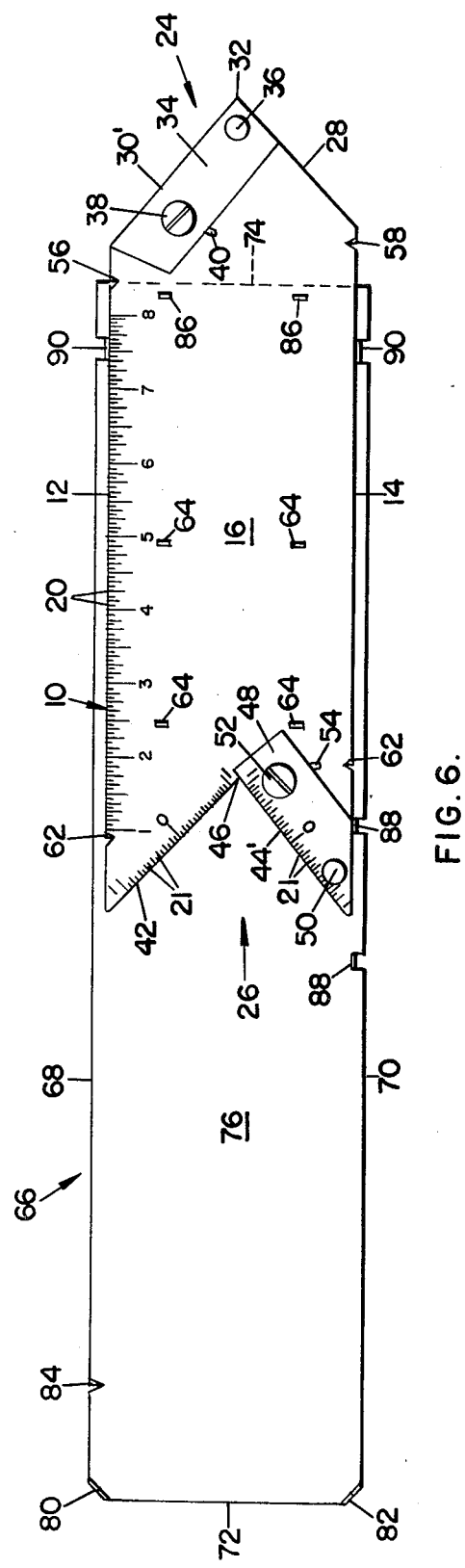
FIG. 6.

LOCATING TOOL

The invention relates to a tool for facilitating the installation of floor covering material such as congoleum, linoleum, vinyl and similar sheet material.

It is used to accurately locate an inside corner, or an outside corner, or circular objects, or straight wall surfaces, or hard to reach areas to be cut out of the sheet material.

Before cutting to size, this sheet material is larger than the floor area to be covered and extends upwardly against walls or other surfaces. Since it is relatively stiff, it is impossible to press into place at corners or hard to reach areas so that it is quite difficult to cut out a matching fit.

A perfect fit can be obtained by use of the tool hereof.

The following steps are followed in the use of the tool to locate corners:

(1) The sheet material is pulled away from the wall and the tool is laid on the floor with its angled edges contacting the inside or outside corner edges of the wall. A provided adjustable member is pivoted at each end of the tool so that the exact wall angles can be duplicated.

(2) Locating tabs in the form of points or prongs extend upwardly from the tool at each side edge adjacent each end thereof. After the tool has been positioned in the corner, the sheet material is laid on the tool and pressed thereagainst so that the points or prongs make indentations on the bottom side of the sheet material. (The prongs will not be long enough to go completely through the material, only long enough to make visible impressions.)

(3) The sheet material is lifted off of the tool and turned back to expose the bottom side thereof. The tool is taken off of the floor and placed flat on the bottom side of the material with the points fitting in the previously made indentations.

(4) The contour of the end of the tool is now traced on the bottom of the sheet material to provide an exact replica of the shape of the corner to be fitted.

(5) The sheet material is then cut by a knife or cutter following this outline.

Similar procedures are followed when straight wall edges are to be located.

One end of the tool is used for locating pipes and circular objects in a similar manner with the aid of dividers.

Additionally, an extension member is provided for locating corners, or circular objects or other wall edges in remote or difficult to reach areas.

In the drawings:

FIG. 4 is a top plan view of an extension member for use with the tool of FIGS. 1-3;

FIG. 5 is a side elevational view of the extension member;

FIG. 6 is a top plan view of the locating tool and extension member combined for one manner of use;

THE LOCATING TOOL

Figure 1:
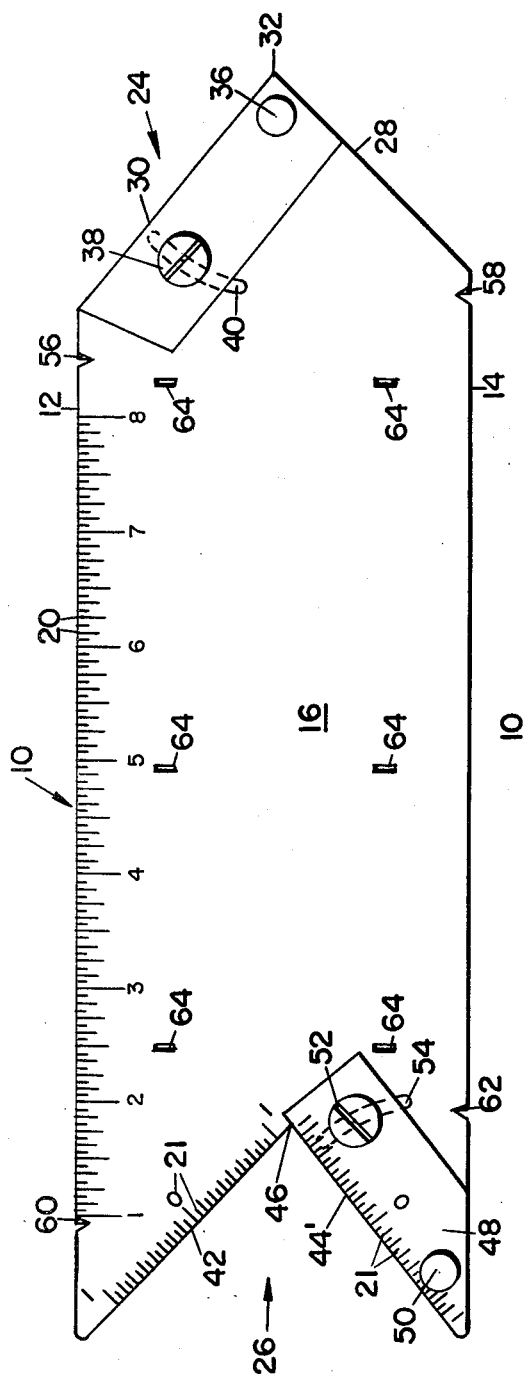
FIG. 1 is a top plan view of a locating tool embodying the invention.
Figure 2:
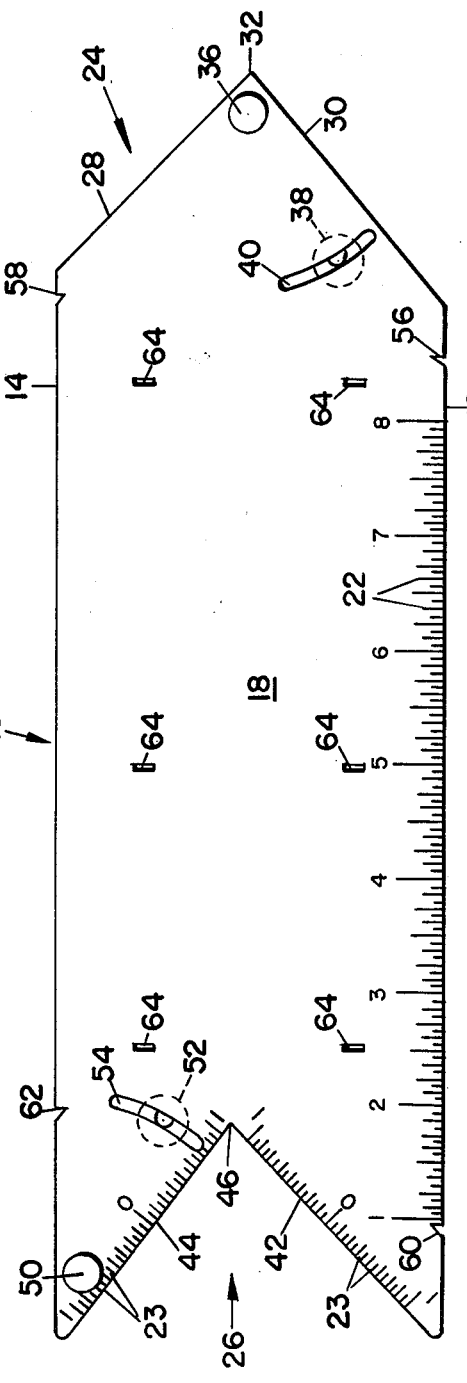
FIG. 2 is an inverted bottom plan view thereof.
Figure 3:
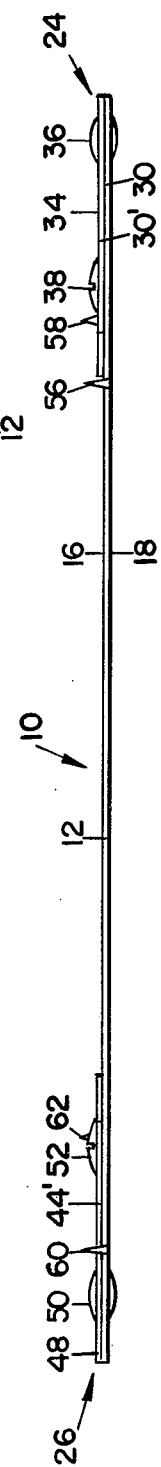
FIG. 3 is a side elevational view thereof.

The locating tool, which is generally indicated by 10, is preferably, but not necessarily, formed from a strong, thin gauge metal such as aluminum or spring steel of approximately 0.032" thickness.

Tool 10 includes spaced, parallel side edges 12 and 14 and upper and lower planar faces 16 and 18, respectively.

An inch or metric scale 20 is provided on upper face 16 along edge 12 and a similar scale 22 is provided on lower face 18. Additional scales may be provided along all edges of the tool on both faces as desired.

One end of the tool, generally designated by 24, is adapted for use in locating inside corners, and the other end of the tool, generally designated 26, is adapted for use in locating outside corners and pipes or circular objects.

Inside corner end 24 includes a pair of edges 28 and 30, edge 28 extending from side edge 14 at an angle of 45° and edge 30 extending from side edge 12 at an angle of 40° and intersecting with edge 28 at an apex 32.

To accommodate for non-true inside corners, a first protractor arm 34 is pivoted to upper face 16 as by a pivot 36 disposed adjacent apex 32, the protractor arm having an edge 30' adapted to register with edge 30 or to be disposed outwardly thereof in order to follow exactly the contour of the corner being located. A cam locking screw 38 is receivable in an arcuate slot 40 in the locating tool for locking the protractor arm in desired positions of adjustment.

Outside corner end 26 includes a pair of edges 42 and 44, edge 42 extending from side edge 12 at an angle of 45° and edge 44 extending from side edge 14 at an angle of 40° and intersecting with edge 42 at a point 46 between the edges 12 and 14.

To accommodate for non-true outside corners, a second protractor arm 48 is pivoted to upper face 16 as by a pivot 50 disposed adjacent the intersection of edges 14 and 44, protractor arm 48 having an edge 44' adapted to register with edge 44 or to be disposed outwardly thereof in order to follow exactly the contour of the corner being located. A cam locking screw 52 is receivable in an arcuate slot 54 in the locating tool for locking the protractor arm in desired positions of adjustment.

Inch or metric scales 21 are provided along edges 42 and 44 on face 16 of tool 10 and along edge 44' of protractor arm 48, and similar corresponding scales 23 are provided along edges 42 and 44 of face 18, all for purposes to appear.

Pairs of penetrating locating tabs in the form of triangular points are struck from each side edge 12 and 14 of the tool and extend upwardly from upper face 16 for purposes to appear.

A first pair of such tabs is disposed adjacent inside corner end 24 and comprises a tab 56 on edge 12 adjacent the intersection of edges 12 and 30 and a tab 58 on edge 14 adjacent the intersection of edges 14 and 28.

A second pair of such tabs is disposed adjacent outside corner end 26 and comprises a tab 60 on edge 12 adjacent the intersection of edges 12 and 42 and a tab 62 on edge 14 adjacent the intersection of edges 14 and 44.

A pair of rows of spaced, aligned, parallel, extension positioning slots 64 are provided in the body of locator tool 10 for purposes to be described.

THE EXTENSION MEMBER

The extension member, which is rectangular in shape, is generally indicated by 66, and is preferably, but not necessarily, formed from a strong, thin gauge metal such as aluminum or spring steel of approximately 0.032" thickness.

The extension member is used in conjunction with locating tool 10, in manner as will appear, to locate corners, or circular objects, or other edges which would normally be difficult to reach and includes spaced, parallel side edges 68 and 70 interconnected by spaced parallel end edges 72 and 74 and has flat upper and lower planar faces 76 and 78 respectively.

A trio of penetrating locating tabs in the form of triangular points, similar to the locating tabs 56–60 of locating tool 10, is struck from the extension member and extends upwardly from upper face 76 for purposes to appear.

A pair of such tabs 80 and 82 is located at the corners of end edge 72 and a third tab 84 is located on side edge 68 in spaced adjacency to tab 80.

A first pair of spaced, rectangular postioning tabs 86, 86 is struck from the extension member along end edge 74 and extends upwardly from upper face 76.

A second pair of spaced, rectangular positioning tabs 88, 88 is struck from the extension member along side edge 70 and extends upwardly from upper face 76.

Figure 7:
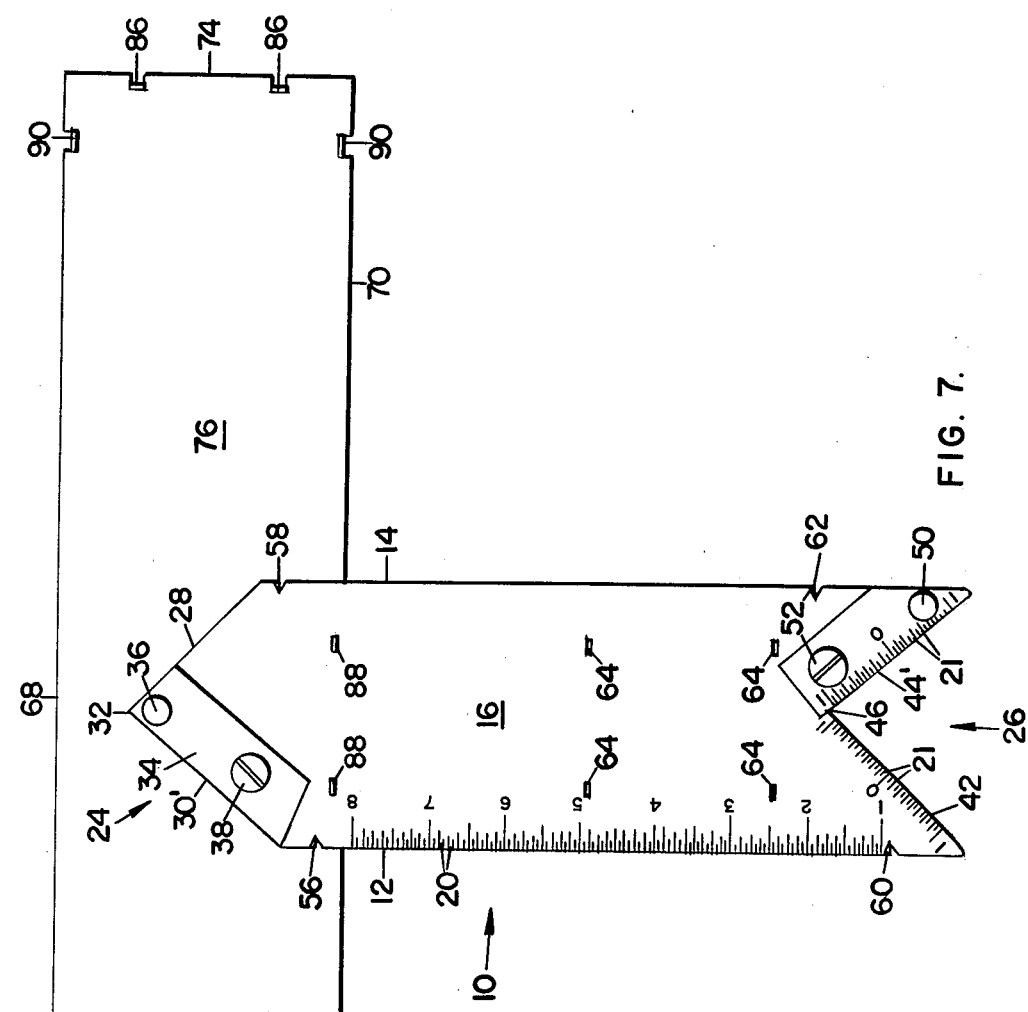
FIG. 7 is a top plan view of the locating tool and extension member combined for another manner of use.

The spacing of the tabs 86, 86 and 88, 88 corresponds to the vertical spacing of the positioning slots 64 in locating tool 10 wherefore the locating tool and extension member can be interengaged, with positioning tabs 86 disposed in positioning slots 64 as shown in FIG. 6, or with positioning tabs 88 disposed in positioning slots 64 as shown in FIG. 7, so that the effective length of the locating tool can be increased.

A pair of edge engaging tabs 90, 90 is struck from the extension member, one along each side edge 68 and 70 adjacent end edge 74 and extend upwardly from upper face 76. The tabs 90 are adapted to embrace the side edges 12 and 14 of the locating tool when the tool and extension member are combined in the manner of FIG. 6 to preclude movement of the tool and extension member relative to each other.

THE MANNER OF USE OF THE LOCATING TOOL

Figure 8:
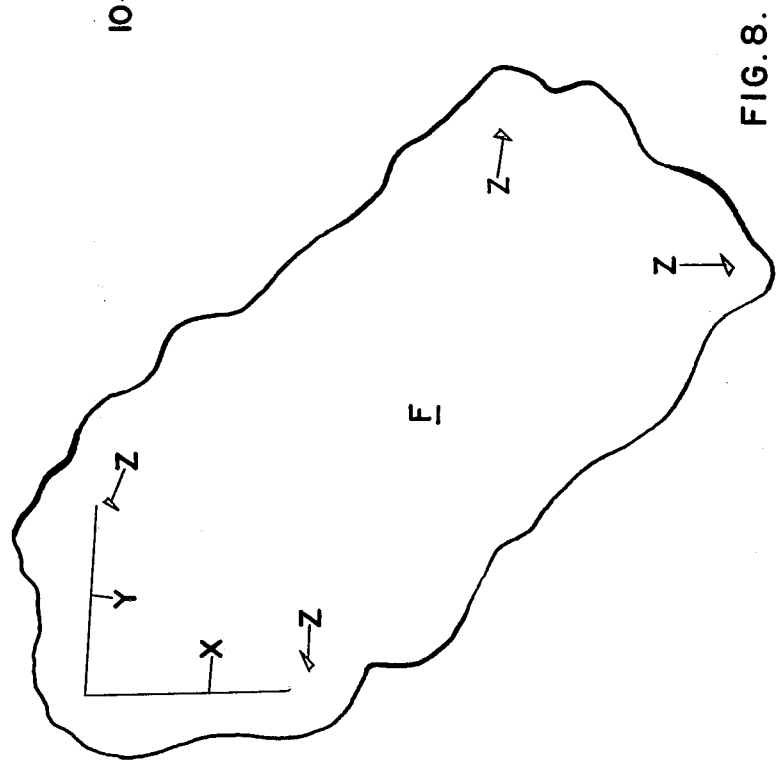
FIG. 8 is a fragmentary bottom plan view of a piece of floor covering material having a corner to be cut marked thereon with the aid of the locating tool.

Locating tool 10 is used for facilitating the installation of floor covering such as congoleum, linoleum, vinyl and similar sheet material, indicated by F in FIG. 8.

The tool is used to accurately locate an inside corner, or an outside corner, or circular objects, or hard to reach straight edges to be cut out of the sheet material.

Before cutting to size, this sheet material is larger than the floor area to be covered and extends upwardly against walls or other surfaces. Since it is relatively stiff, it is impossible to press into place at corners or hard to reach areas so that it is quite difficult to cut out a matching fit.

The following steps are followed in the use of the tool to locate corners:

(1) The sheet material is pulled away from the wall and the tool is laid on the floor with its ends 24 or 26 contacting the inside or outside corner edges of the wall. The protractor arms 34 or 48 are adjusted so that the exact wall angles are duplicated.

(2) After the tool has been positioned in the corner, the sheet material is laid on the tool and pressed thereagainst so that the locating tabs 56, 58, 60 or 62 as appropriate make indentations Z on the bottom side of the sheet material as shown in FIG. 8. (The locating tabs will not be long enough to go completely through the material, only long enough to make visible impressions).

(3) The sheet material is lifted off of the tool and turned back to expose the bottom side thereof. The tool is taken off of the floor and placed flat on the bottom side with the locating tabs 56, 58, 60 or 62 fitting in the previously made indentations Z.

(4) The contour of the end of the tool is now traced on the bottom of the sheet material to provide an exact replica of the shape of the corner to be fitted as indicated by lines X and Y in FIG. 8.

(5) The sheet material is then cut by a knife or cutter following this outline.

A similar procedure is used in locating pipes or circular objects, with the outside corner end 26 of the tool being utilized. Herein, the edges 42 and 44 or the edge 44' of protractor arm 48 contact the periphery of the pipe or circular object with the points of contact indicating its exact diameter. The points of contact of the object with the edges 42, 44 or 44' are noted on the scales 21 and the sheet material pressed onto the locating tabs 56 and 56 to make indentations on the bottom side of the sheet material.

The sheet material is lifted off of the tool and turned back to expose the bottom side thereof. The tool is taken off of the floor and placed flat on the bottom side with the locating tabs 56 and 58 fitting in the previously made indentations.

The point locations previously noted on scales 21 are now noted on scales 23 and marked on the bottom side. Then, using dividers, the exact diameter of the circular object is scribed on the bottom of the sheet material and the material cut with a knife.

When the extension member is combined with the locating tool as shown in FIG. 6, the same procedures are followed, except that the locating tabs 80, 82 and 84 of the extension member may be utilized to make the indentations Z on the bottom side of the sheet material.

When the tool and extension are used in the manner as shown in FIG. 7, a hidden straight edge such as under radiators or the like can be located, with the edge 68 of the extension member being placed against the wall edge to be located and the bottom side of the sheet material being pressed against the locating tabs 60 and 62 to make the indentations Z, whereupon the procedure indicated above is followed.

I claim:

1. A multiapplication profiler for use by floor covering mechanics as a template in establishing a profile on the under surface of a floor cover for the cutting thereof preparatory to the fitting of the cover in a selected one of a plurality of applications within a room area comprising:

an elongated planar body having upper and lower planar faces and spaced opposite and parallel side edges and spaced opposite ends, the side edges constituting straight wall locating edges, one of the ends constituting an inside corner locating end and the other of the ends constituting an outside corner locating end and circular object locating end, the inside corner end including a pair of outboard directed end edges converging toward each other from and at different angles relative to the opposite side edges, the outside corner end including a pair of inboard directed end edges converging toward each other from and at different angles relative to the opposite side edges, a plurality of locator tabs projecting upwardly from the upper planar face, all adapted and arranged for use in first the placement of the body on the floor for the appropriate application and the pressing of the cover downwardly thereover for impressing locator indentations into the under surface and second the placement of the body on the under surface with the locator tabs in the respective locator indentations preparatory to tracing the outline of the appropriate body edge on the under surface for the cutting operation.

2. In the profiler of claim 1 including: protractor arms pivoted to each corner end for accommodating to non-true corners.

3. In the profiler of claim 1 including measuring indicia along the side and end edges.

4. In the profiler of claim 2 including measuring indicia along the protractor arms.

5. In the profiler of claim 1, including a flat extension member adapted for integration with the body and having a plurality of locator tabs projecting upwardly therefrom.

6. In the profiler of claim 5, wherein the extension member has positioning tabs receivable in complemental positioning slots in the body.

* * * * *